US008873957B2

(12) United States Patent
Tanaka et al.

(10) Patent No.: US 8,873,957 B2
(45) Date of Patent: Oct. 28, 2014

(54) LOGICAL-LINK MANAGEMENT METHOD AND COMMUNICATION DEVICE

(75) Inventors: Masaki Tanaka, Tokyo (JP); Yukio Hirano, Tokyo (JP); Koshi Sugimura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 106 days.

(21) Appl. No.: 13/813,491

(22) PCT Filed: Dec. 28, 2010

(86) PCT No.: PCT/JP2010/073792
§ 371 (c)(1),
(2), (4) Date: Jan. 31, 2013

(87) PCT Pub. No.: WO2012/090323
PCT Pub. Date: Jul. 5, 2012

(65) Prior Publication Data
US 2013/0129354 A1 May 23, 2013

(51) Int. Cl.
| | | |
|---|---|---|
| H04B 10/20 | (2006.01) | |
| H04J 14/00 | (2006.01) | |
| H04L 12/26 | (2006.01) | |
| H04L 12/24 | (2006.01) | |
| H04B 10/27 | (2013.01) | |
| H04B 10/272 | (2013.01) | |
| H04W 24/00 | (2009.01) | |
| H04W 76/02 | (2009.01) | |

(52) U.S. Cl.
CPC ............ H04B 10/27 (2013.01); H04L 43/0811 (2013.01); H04W 24/00 (2013.01); H04L 41/0672 (2013.01); H04W 76/028 (2013.01); H04B 10/272 (2013.01)
USPC .................................. 398/58; 398/67; 398/72

(58) Field of Classification Search
USPC .................................... 398/66–68, 71, 72, 58
See application file for complete search history.

(56) References Cited

U.S. PATENT DOCUMENTS

| | | | |
|---|---|---|---|
| 2003/0072261 A1 | 4/2003 | Shinagawa | .................... 370/229 |
| 2007/0025734 A1* | 2/2007 | Oogushi et al. | ................. 398/71 |
| 2009/0016267 A1 | 1/2009 | Otsubo et al. | ................. 370/328 |
| 2010/0124420 A1* | 5/2010 | Shiota | ............................. 398/58 |

FOREIGN PATENT DOCUMENTS

| | | |
|---|---|---|
| JP | 2000 293454 | 10/2000 |
| JP | 2003 124980 | 4/2003 |
| JP | 2009 21916 | 1/2009 |

OTHER PUBLICATIONS

"Operations, Administration, and Maintenance (OAM)," IEEE, vol. 802.3, Total 109 Pages, (2008).

(Continued)

Primary Examiner — Dalzid Singh
(74) Attorney, Agent, or Firm — Oblon, Spivak, McClelland, Maier & Neustadt, L.L.P.

(57) ABSTRACT

A logical-link management method to be executed in an optical communication system including a station side device (OLT) and a subscriber side device (ONU) that is capable of setting a plurality of logical links together with the OLT, in which the OLT transmits a signal for managing the ONU via a single logical link. The logical-link management method includes a status monitoring of the OLT monitoring whether there is a change in a connection status of the logical link between the OLT and the ONU and a link resetting of the OLT resetting, when a change of the connection status of the logical link is detected at the status monitoring, a device management logical link used for transmitting the signal for managing the ONU according to a predetermined procedure.

19 Claims, 14 Drawing Sheets

(56) References Cited

OTHER PUBLICATIONS

Chengbin, S., et al., "Task Force 4 Baseline proposals for SIEPON eOAM," SIEPON, pp. 1-15, (Jun. 2010).

International Search Report Issued Apr. 5, 2011 in PCT/JP10/73792 Filed Dec. 28, 2010.

* cited by examiner

FIG.2

| ONU No. | LOGICAL LINK No. | SELECTION PRIORITY | CONNECTION STATUS |
|---|---|---|---|
| 1 | 1 | 1 | CONNECTED |
| | 2 | 2 | DISCONNECTED |
| | 3 | 3 | CONNECTED |
| 2 | 1 | 3 | DISCONNECTED |
| | 2 | 2 | CONNECTED |
| | 3 | 1 | CONNECTED |
| ... | ... | ... | ... |

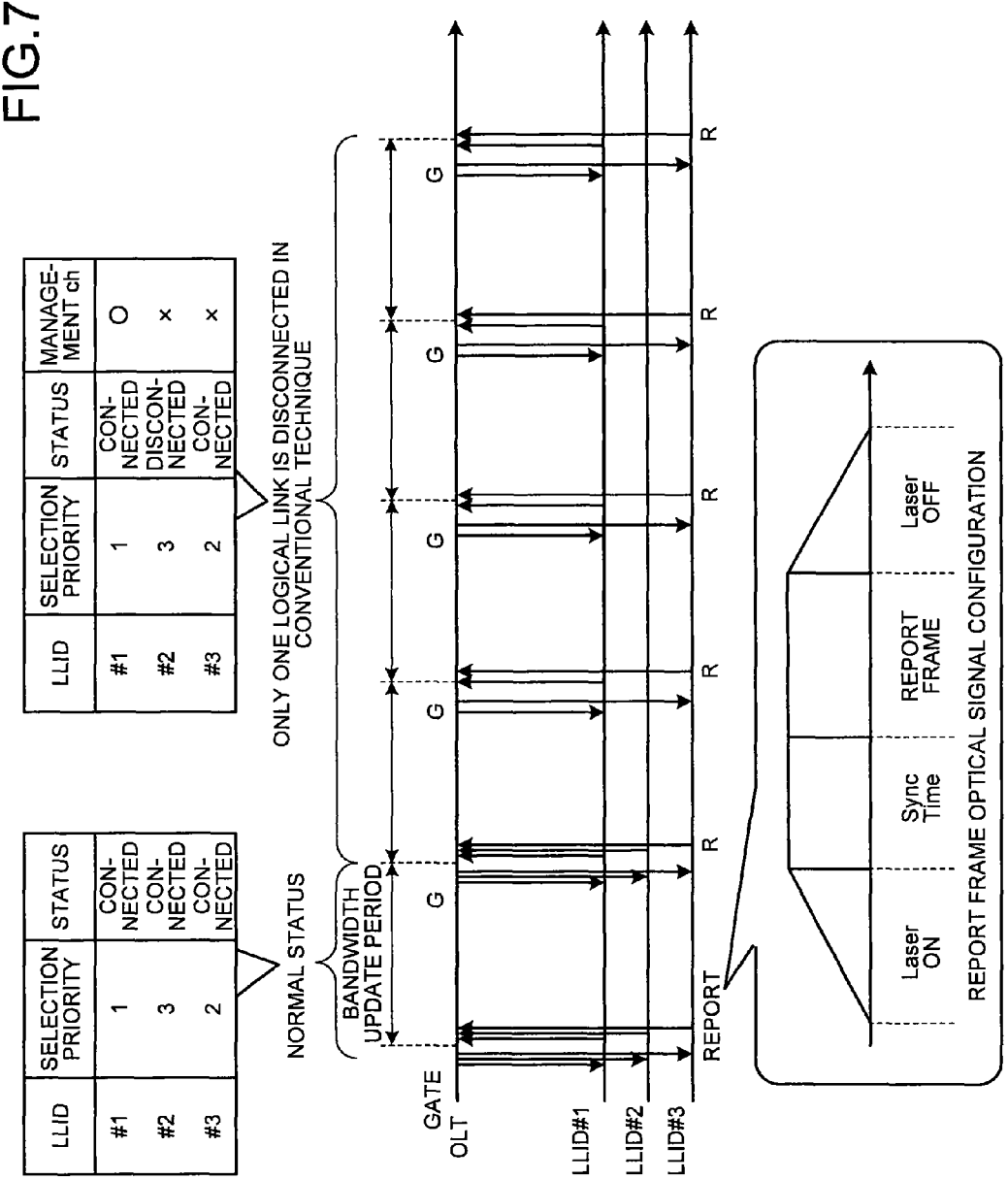

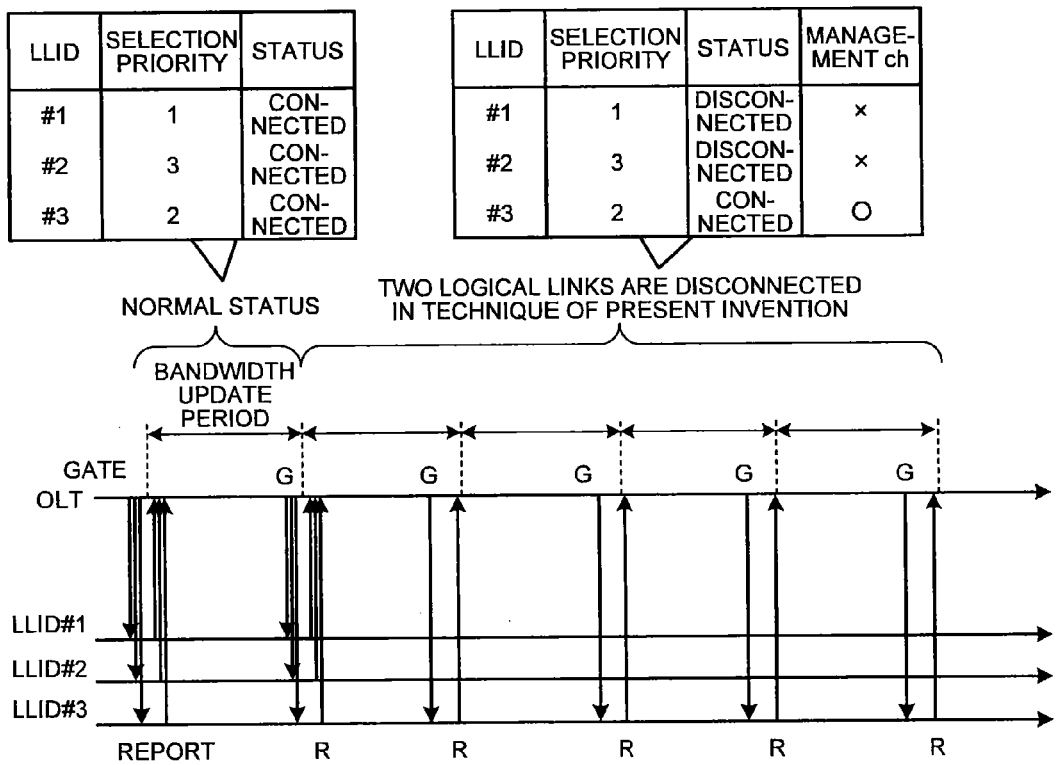

FIG.11

| ONU No. | LOGICAL LINK No. | BANDWIDTH UPDATE PERIOD [ms] | CONNECTION STATUS |
|---|---|---|---|
| 1 | 1 | 2 | CONNECTED |
| | 2 | 3 | DISCONNECTED |
| | 3 | 4 | CONNECTED |
| 2 | 1 | 1 | DISCONNECTED |
| | 2 | 5 | CONNECTED |
| | 3 | 10 | CONNECTED |
| ... | ... | ... | ... |

| ONU No. | LOGICAL LINK No. | TRAFFIC AMOUNT [KByte/UNIT TIME] | CONNECTION STATUS |
|---|---|---|---|
| 1 | 1 | 123 | CONNECTED |
| | 2 | 0 | DISCONNECTED |
| | 3 | 4567 | CONNECTED |
| 2 | 1 | 0 | DISCONNECTED |
| | 2 | 1234 | CONNECTED |
| | 3 | 5678 | CONNECTED |
| ... | ... | ... | ... |

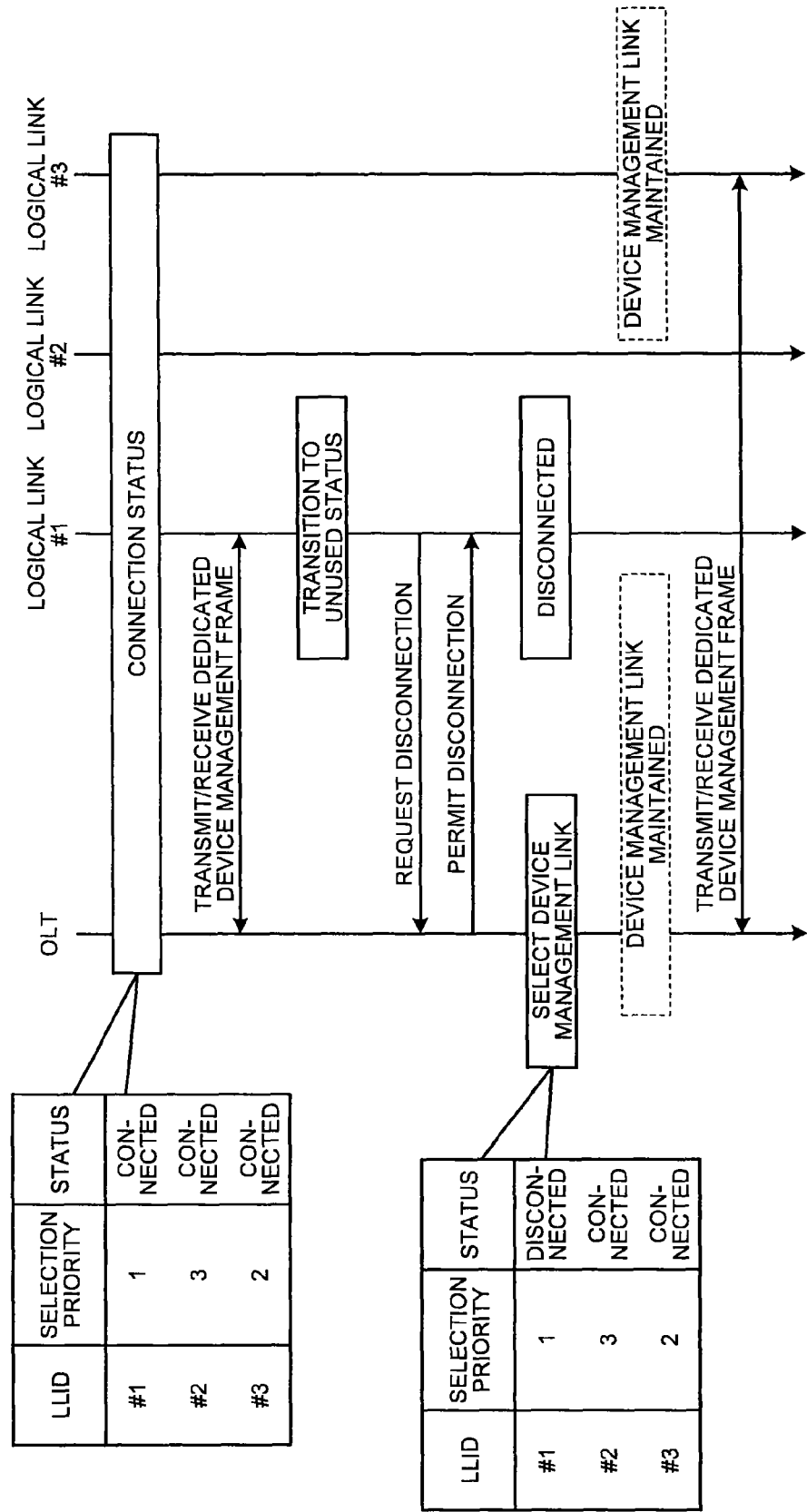

LOGICAL-LINK MANAGEMENT METHOD AND COMMUNICATION DEVICE

FIELD

The present invention relates to a logical-link management method for managing a logical link that is set between a master station device and a slave station device in a communication system in which the master station device and a plurality of slave station devices are connected in a one-to-many relationship and to a communication device that performs management of a logical link.

BACKGROUND

In recent years, a PON (Passive Optical Network) system has become employed in an access system network that links homes, companies, and the like with an upper network. The PON is a communication system having a configuration in which a master station device (OLT: Optical Line Terminal) and a plurality of slave station devices (ONU: Optical Network Unit) are connected in one-to-many relationship with an optical fiber and a splitter.

For example, the PON system includes an EPON (Ethernet® PON) system defined in Non Patent Literature 1. In the EPON system, the data transmission rate of the upstream and downstream communications is set to 1 Gbit/s, and a bidirectional communication is performed by the wavelength division multiplexing method using different wavelengths for the upstream communication and the downstream communication. When the ONU transmits upstream data, the data is transmitted by the time-division multiplexing method in which a plurality of ONUs use an upstream bandwidth in a divided manner.

Furthermore, in the EPON system, setting a management channel for each logical link is defined in Non Patent Literature 1, while data transmission is controlled for each logical link. The management channel is a channel that is used for performing management of a logical link and management of a device (management of a slave station device), and in the management of the device, for example, acquisition and notification of a device management status, device setting, and the like are performed. In the control using the management channel, control data is transmitted and received by using an OAM (Operation, Administration, Maintenance) frame.

CITATION LIST

Non Patent Literature

Non Patent Literature 1: IEEE (Institute of Electrical and Electronics Engineers) 802.3

SUMMARY

Technical Problem

Although communication is generally performed by setting one logical link to one ONU in conventional PON systems, in order to realize various services in a flexible manner, an ONU that is capable of setting a plurality of logical links between itself and the OLT has been widely used. However, the technique described in Non Patent Literature 1 is based on the assumption that one logical link is set to one ONU, so that a method of mounting and operating a management channel when setting a plurality of logical links to one ONU is not defined in the technique.

Particularly, it is not defined to which one of a plurality of logical links the management channel for managing the device is provided (which logical link should be used to manage the device). Normally, because the logical link is supposed to be set one by one, it can be considered that it suffices to provide the management channel for managing the device to a logical link that is set first; however, in such a case, the following problem is expected to be happened.

In the PON system, it is desired to achieve a reduction of power consumption and effective usage of an upstream bandwidth to be used by a plurality of ONUs in a divided manner. For example, when a video distribution service is used, an STB (Set Top Box) is connected to a physical port of a user, and a logical link for streaming video data from upstream side of the ONU is set. At this time, when the condition does not allow a reception of the video distribution service, such as the STB is not connected or the power is not turned on, the logical link can be disconnected without affecting the service because the logical link is not used. When the logical link is disconnected, the power consumption can be reduced without wasting a power needed for a communication of the logical link. Furthermore, there is no waste of an upstream bandwidth used for the data communication. In this manner, when implementing a power saving method in an ONU in which a plurality of logical links are mounted (set), a disconnection of an unused logical link is one of the effective methods to reduce the power consumption.

However, because the disconnection of the logical link to which the management channel for managing the device is provided disables the management of the device (ONU), it cannot be disconnected even when a user does not use the service, and this causes a problem of disabling the reduction of the power consumption. There is also a problem that the upstream bandwidth cannot be prevented from being wasted. As explained above, it is because Non Patent Literature 1 neither describes any mounting and operating method of a management channel when setting a plurality of logical links to one ONU, nor describes a method of changing a logical link for device management (a logical link to which a management channel for managing a device is provided).

The present invention has been achieved in view of the above problems, and an object of the present invention is to realize a low power consumption in an ONU that is capable of setting a plurality of logical links and to obtain a logical-link management method and a communication device for achieving efficient usage of an upstream bandwidth.

Solution to Problem

In order to solve the aforementioned problems, a logical-link management method to be executed in an optical communication system including a station side device and a subscriber side device that is capable of setting a plurality of logical links between the station side device and the subscriber side device, wherein the station side device transmits a signal for managing the subscriber side device via a single logical link, according to one aspect of the present invention is configured in such a manner as to include: a status monitoring step of the station side device monitoring whether there is a change in a connection status of a logical link between the station side device and the subscriber side device; and a link resetting step of the station side device resetting, when a change in the connection status of the logical link is detected at the status monitoring step, a logical link for device management that is a logical link used for transmitting the signal for managing the subscriber side device according to a predetermined procedure.

Advantageous Effects of Invention

When the logical-link management method according to the present invention is applied, a station side device resets a logical link for managing a device (hereinafter may be referred to just as a "logical link for device management") in a case where there is a change in a connection status of a logical link between a station side device and each subscriber side device under control. Therefore, even when a logical link used as a logical link for a channel for device managing (hereinafter may be referred to just as a "logical link for device management channel") is disconnected, the station side device can continue the device management of the subscriber side device by using a new logical link for device management channel. In addition, it is possible to realize a low power consumption of a system and an improvement of the usage efficiency of an upstream bandwidth.

BRIEF DESCRIPTION OF DRAWINGS

FIG. 2 is an example of a logical-link-status management table stored in a device-management-channel control unit of an OLT.

FIG. 7 is an example of a conventional logical-link control operation.

FIG. 8 is an example of a logical-link control operation in the first embodiment.

FIG. 9 is an example of a logical-link-status management table stored in a device-management-channel control unit of an OLT.

FIG. 11 is an example of a logical-link-status management table stored in a device-management-channel control unit of an OLT.

FIG. 18 is an example of an operation of transmitting and receiving a device management frame in the communication system according to the fifth embodiment.

DESCRIPTION OF EMBODIMENTS

Exemplary embodiments of a logical-link management method and a communication device according to the present invention will be explained below in detail with reference to the accompanying drawings. The present invention is not limited to the embodiments.

First Embodiment

Figure 1:
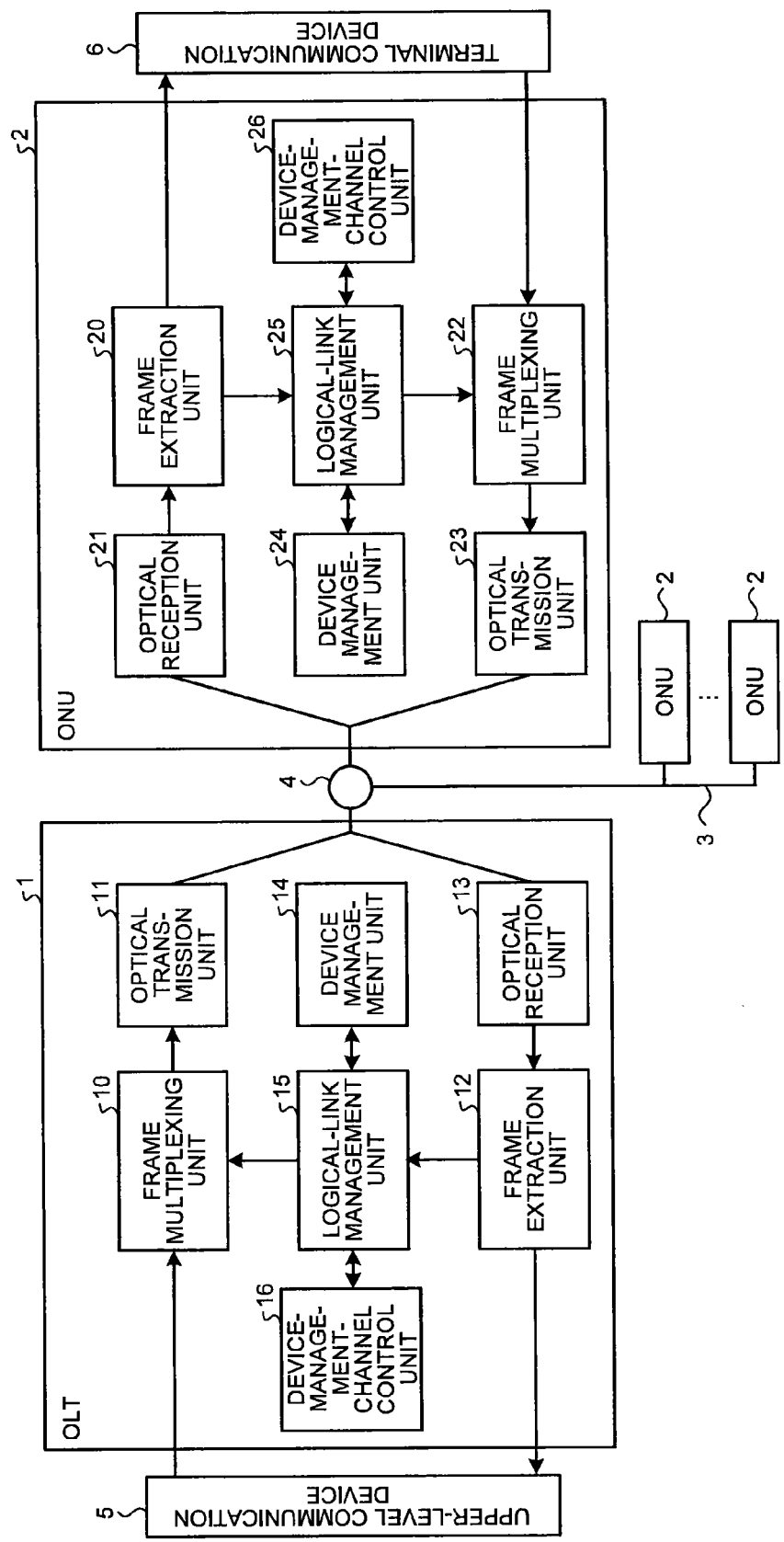
FIG. 1 is a configuration example of a communication system and a communication device to which a logical-link management method according to the present invention is applied.

FIG. 1 is a configuration example of a communication system and a communication device to which the logical-link management method according to the present invention is applied.

As shown in FIG. 1, the communication system according to the present embodiment includes an OLT (a master station device) 1, a plurality of ONUs (slave station devices) 2, an optical fiber 3 that connects the OLT 1 and each of the ONUs 2, a splitter 4 that branches the optical fiber 3 for one-to-many connection, an upper communication device 5 configured to be connected to the upstream side of the OLT 1, and a terminal communication device 6 configured to be connected to the downstream side of the ONU 2. Each of the ONUs 2 has the same internal configuration. Therefore, only one ONU 2 is shown in FIG. 1. Furthermore, although an example in which three ONUs are connected to the OLT 1 is shown in FIG. 1, the number of the ONUs to be connected is not limited to any particular number.

The OLT 1 according to the present embodiment includes a frame multiplexing unit 10, an optical transmission unit 11, a frame extraction unit 12, an optical reception unit 13, a device management unit 14, a logical-link management unit 15, and a device-management-channel control unit 16.

In the OLT 1, the frame multiplexing unit 10 receives a downstream frame from the upper communication device 5 and multiplexes a management-channel data frame. The management-channel data frame is a frame containing information (data) for managing the logical link and information (data) for performing management of the ONU (device management), and these pieces of information are transmitted through a management channel. The optical transmission unit 11 transmits the frame multiplexed by the frame multiplexing unit 10 to each of the ONUs 2 as an optical signal. The frame extraction unit 12 extracts the management-channel data table from an upstream data frame received via the optical reception unit 13 and transmits general data to the upper communication device 5. The optical reception unit 13 receives an optical signal from the ONU 2. The device management unit 14 performs device management of each of the ONUs 2 connected via the optical fiber 3 and the splitter 4. For example, in the device management, detection of a defect of the device (the ONU 2) is performed. Furthermore, the device management unit 14 performs setting of a priority control operation of the data frame and the like. The logical-link management unit 15 manages the logical link between the OLT 1 and each of the ONUs 2 under control and transmits and receives the management-channel data frame. In the management of the logical link, control of connection and disconnection of the logical link, detection of disconnection of the logical link and the like are performed. For example, in the detection of disconnection of the logical link, when no data is transmitted from the ONU for a predetermined time or when there is no response to the data transmitted to the ONU for a predetermined time, the logical-link management unit 15 determines that the logical link is disconnected. The device-management-channel control unit 16 manages the management channel used in the device management performed by the device management unit 14, that is, the logical link used when transmitting and receiving data for device management.

Each of the ONUs 2 according to the present embodiment includes a frame extraction unit 20, an optical reception unit 21, a frame multiplexing unit 22, an optical transmitting unit 23, a device management unit 24, a logical-link management unit 25, and a device-management-channel control unit 26.

In the ONU 2, the frame extraction unit 20 extracts the management-channel data frame from downstream data frames received via the optical reception unit 21 and transmits general data to the downstream side terminal communication device 6. The optical reception unit 21 receives downstream optical signal. The frame multiplexing unit 22 receives an upstream signal from the terminal communication device 6 and multiplexes a management-channel data frame. The optical transmitting unit 23 transmits an optical signal to the OLT 1. The device management unit 24 performs management of the device itself (the ONU 2). The logical-link management unit 25 manages the logical link between the OLT 1 and the ONU 2 and transmits and receives the management-channel data frame. The device-management-channel control unit 26 manages the logical link for setting the management channel used in the device management performed by the device management unit 24.

Before explaining the main operation of the present invention, general communication operations of the OLT 1 and the ONU 2 are explained. First, the ONU 2 receives data from the terminal communication device 6 at the frame multiplexing unit 22, and converts the upstream data into an optical signal and transmits the optical signal to the OLT 1 via the optical transmitting unit 23 based on transmission permission from the OLT 1. The OLT 1 converts the optical data from the ONU 2 (upstream data transmitted as the optical signal) into an electrical signal at the optical reception unit 13 and transmits the electrical signal to the upper communication device 5 via the frame extraction unit 12. On the other hand, downstream data from the upper communication device 5 is converted from an electrical signal to an optical signal at the optical transmission unit 11 via the frame multiplexing unit 10 and transmitted to the ONU 2. The ONU 2 converts an optical signal from the OLT 1 into an electrical signal at the optical reception unit 21 and transmits the electrical signal to the terminal communication device 6 via the frame extraction unit 20.

The OLT 1 performs management of the logical link for each of the ONUs 2 and for each logical link. The management channel used at this time is referred to as "logical-link management channel". Furthermore, when a plurality of logical links are set between the OLT 1 and one ONU 2, the OLT 1 performs a device management of the ONU by using one of the management channels (logical-link management channels) separately set to the logical links. The management channel used for in this device management is referred to as "device management channel". The OLT 1 multiplexes a data frame of the logical-link management channel and the device management channel with data from the upper communication device 5 at the frame multiplexing unit 10 and transmits the multiplexed data to the ONU 2. The data frame of the logical-link management channel is generated by the logical-link management unit 15, and the data frame of the device management channel is generated by the device management unit 14.

The ONU 2 extracts a data frame of the device management channel and the logical-link management channel at the frame extraction unit 20 and performs a process following an instruction from the OLT 1, that is, an instruction for managing the device itself (the ONU 2 itself), an instruction for managing the logical link through which the management channel is received, or a control instruction. At this time, when a response is needed, the ONU 2 transmits a data frame (a response frame) by using the logical-link management channel or the device management channel through which the instruction is received. The data frame is multiplexed with the data frame transmitted from the terminal communication device 6 at the frame multiplexing unit 22 and transmitted to the OLT 1.

A device management method by the OLT 1, which is a main part of the present invention, is explained next. FIG. 2 is an example of a logical-link-status management table stored in the device-management-channel control unit 16 of the OLT 1. In this management table, selection priority and connection status of each logical link set between the OLT 1 and each ONU connected to the OLT 1 are recorded. The selection priority is a priority in selecting a logical link for setting the device management channel. The device-management-channel control unit 16 monitors the selection priority in selecting a logical link as the logical link (a logical link through which the data frame of the device management channel is transmitted and received) for setting the device management channel and the connection status of each logical link for each logical link. In this example, a case in which three logical links are set to one ONU 2 is shown; however, the number of logical links is not limited to any particular number. Furthermore, a smaller value of the selection priority is supposed to mean a higher priority.

Figure 3:
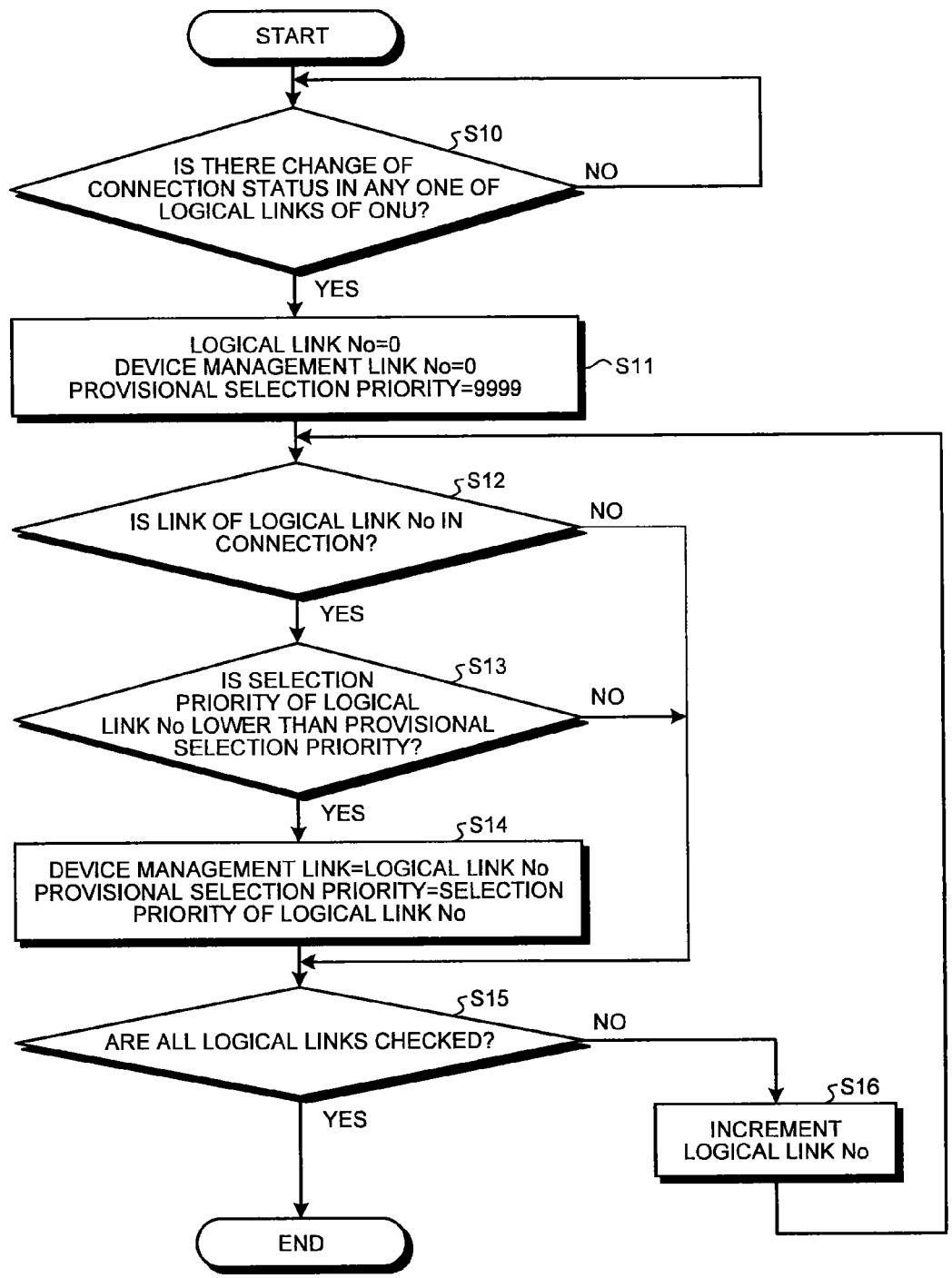
FIG. 3 is a flowchart of an example of a method of determining a logical link for setting a device management channel by a device-management-channel control unit of an OLT according to a first embodiment.

A process of determining the logical link for setting the device management channel by the device-management-channel control unit 16 is described next with reference to FIG. 3. FIG. 3 is a flowchart of an example of a method of determining a logical link for setting a device management channel by the device-management-channel control unit 16 of the OLT 1 according to the first embodiment. In the OLT 1, as shown in FIG. 3, every time when the connection status of the logical link of the ONU 2 under control is changed, the logical link channel used for performing the device management of the ONU 2 of which the connection status has been changed (that is, the logical link channel for setting the device management channel) is reselected.

In the OLT 1, the device-management-channel control unit 16 monitors the connection status of the logical link between the OLT 1 and each of the ONUs 2 under control by enquiring the logical link management unit 15 or the like (Step S10), and when there is a change of the connection status in any one of the monitored logical links (YES at Step S10), moves to Step S11 and starts a process of selecting the device management channel. When there is no change in the connection status in each monitored logical link (NO at Step S10), the device-management-channel control unit 16 continues to monitor the change in the connection status.

First, in the process of selecting the device management channel, a logical link No that serves as an index is initialized to 0. Also at this time, a device management link No is initialized to 0, and a provisional selection priority used in a comparison calculation is initialized to the maximum value (9999 in this example) (Step S11). The device management link is a logical link for setting the device management channel.

Subsequently, a connection status of a logical link to be compared (a logical link indicated by the logical link No) is checked (Step S12). When the logical link indicated by the logical link No is in connected state (YES at Step S12), the selection priority of the logical link indicated by the logical link No and the provisional selection priority are compared with each other (Step S13). The selection priority of the logical link indicated by the logical link No is the selection priority recoded in the management table shown in FIG. 2, which is the selection priority corresponding to each logical link No in the ONU of which the connection status has been changed. For example, when the connection status has been changed in the logical link of the ONU of which a management number of the ONU (ONU No) is "1" and when the current logical link No is "1", the selection priority is "1". When the selection priority of the logical link indicated by the logical link No is lower than the provisional selection priority (YES at Step S13), the device management link (a logical link for setting the device management channel) is provisionally determined to be the logical link indicated by the current logical link No, and the provisional selection priority is updated to the selection priority of the logical link indicated by the current logical link No (Step S14).

Upon performing Step S14, it is checked whether the processes of Steps S12 to S14 described above has been performed for all the logical links set to the ONU, the connection status of the logical link of which has been changed (Step S15). When the processes are completed for all the logical links (YES at Step S15), the process of determining the logical link for setting the device management channel is ended. In this case, the device management link that is provisionally determined at Step S14 described above (a logical link corresponding to a value of the device management link at the time when the determination process is ended) is determined to be the final device management link (a logical link for setting the device management channel), and thereafter the data frame of the device management channel is transmitted and received through this determined logical link. Specifically, the device-management-channel control unit 16 notifies the determination result to the device management unit 14 via the logical-link management unit 15, and when transmitting the management data to the ONU, the device management unit 14 transmits the data frame of the device management channel via the logical link channel notified from the device-management-channel control unit 16. On the other hand, when the processes are not completed for at least one logical link (NO at Step S15), the logical link No is incremented (Step S16), and the process control returns to Step S12 to continue the process.

On the other hand, when it is determined that the logical link indicated by the logical link No is disconnected at Step S12 described above (NO at Step S12), Step S15 is performed without performing Steps S13 and S14 described above. Furthermore, when it is determined that the selection priority of the logical link indicated by the logical link No is higher than the provisional selection priority at Step S13 described above (NO at Step S13), Step S15 is performed without performing Step S14.

When the change of the connection status of the logical link has been detected in a plurality of ONUs at Step S10 described above, the processes of Steps S11 to S16 are performed for each ONU of which the connection status has been changed, and the logical link for setting the device management channel is determined for each ONU.

Figure 4:
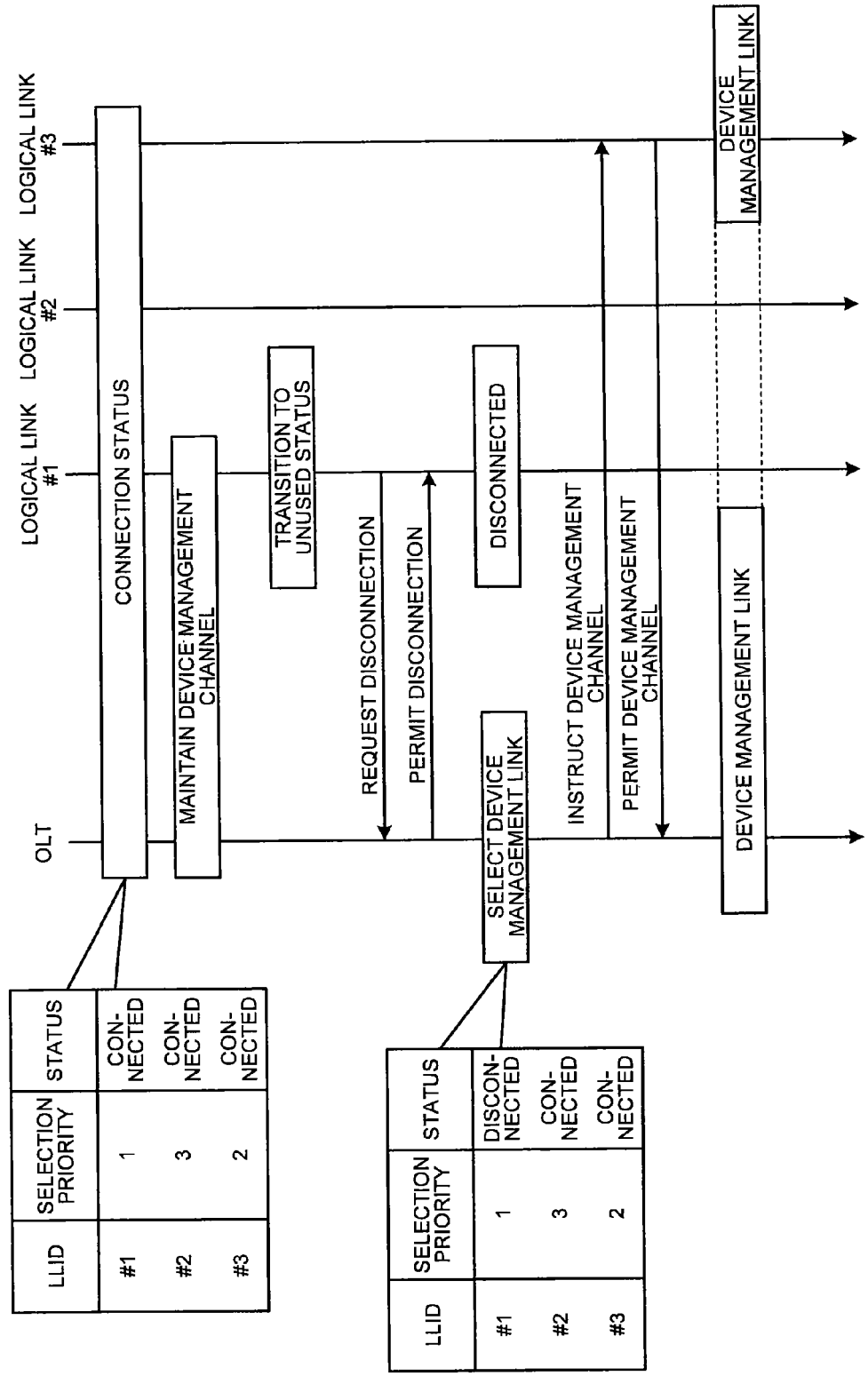
FIG. 4 is a sequence diagram of an operation of changing the setting of a device management channel.

An operation of changing the setting of the device management channel between the OLT 1 and the ONU 2 is described next with reference to a sequence diagram shown in FIG. 4. As shown in FIG. 4, in the OLT 1, three logical links (logical links #1, #2, and #3) are initially established with the ONU 2, and the selection priorities 1, 3, and 2 are set to the logical links #1, #2, and #3, respectively. Furthermore, the device management channel is established by using the logical link #1 having the highest selection priority. When the status of the logical link #1 makes a transition from this status to an unused status, the ONU 2 transmits a disconnection request from the logical link #1 to the OLT 1. Upon receiving the disconnection request, the OLT 1 transmits a disconnection permission to the logical link (the logical link #1). In this state, both the OLT 1 and the ONU 2 recognize that the logical link #1 is disconnected and the device management channel is disconnected. The OLT 1 then performs reselection of the logical link for setting the device management channel by performing the processes shown in FIG. 3 (Steps S11 to S16), and selects the logical link #3 as a new device management channel. The OLT 1 then transmits a device management channel instruction indicating that the logical link is used for the device management channel to the selected logical link. The ONU 2 permits to use the logical link #3 as the device management channel and transmits a device-management-channel permission frame to the OLT 1. An LLID shown in FIG. 4 is an identifier of the logical link (Logical Link ID).

In the OLT 1 that received the device-management-channel permission frame from the ONU 2, the device-management-channel control unit 16 generates a disconnection-permission and device-management instruction frame. Meanwhile, in the ONU 2, the device-management-channel control unit 26 generates a disconnection permission and device-management permission frame, and these frames are transmitted and received between the OLT 1 and the ONU 2.

The ONU 2 performs management of each logical link at the logical-link management unit 25. The information on the device management channel notified from the OLT 1 is analyzed at the device-management-channel control unit 26, and an instruction is issued to the logical-link management unit 25 such that the data frame of the device management channel is transmitted and received by using a logical link indicated by an analysis result. Upon receiving the data frame of the device management channel from the instructed logical link, the logical-link management unit 25 delivers the data to the device management unit 24 to perform the process of managing and controlling the device itself. Furthermore, when a response is needed, the logical-link management unit 25 transmits the data (a device-management data frame) generated by the device management unit 24 to the OLT 1. At this time, the logical-link management unit 25 transmits the data through the management channel instructed from the OLT 1.

Figure 5:
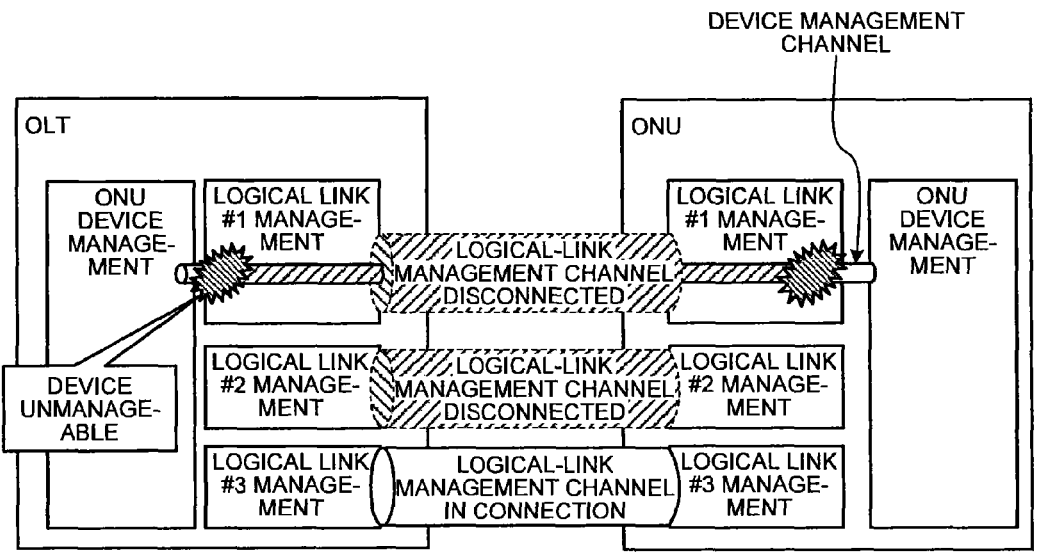
FIG. 5 is an operation example when there is a change in a connection status of a logical link in a conventional communication system.
Figure 6:
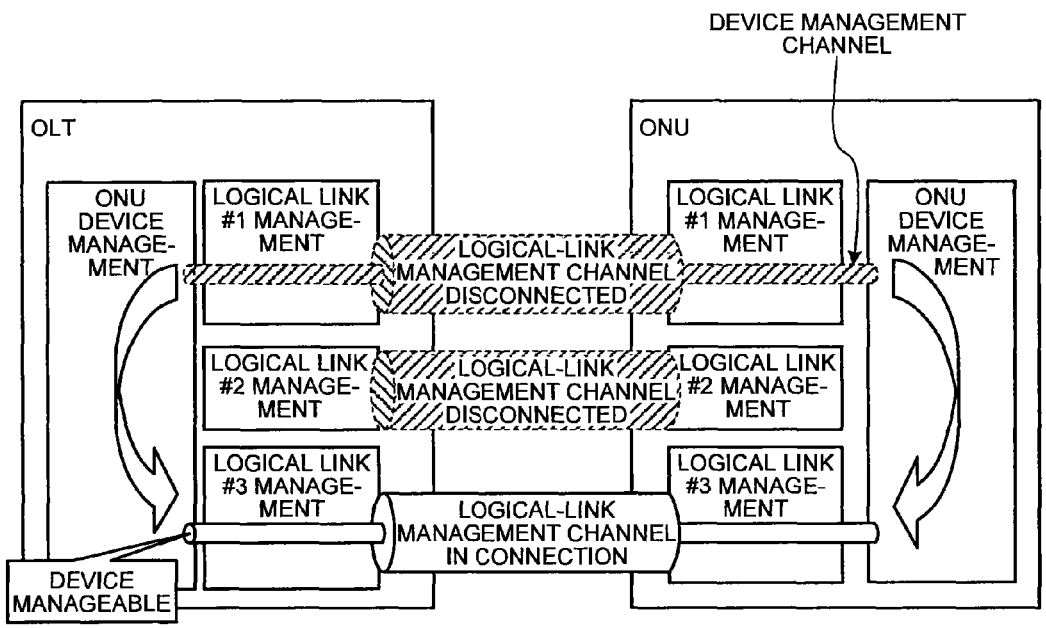
FIG. 6 is an operation example when there is a change in a connection status of a logical link in a communication system according to the first embodiment.

An operation of shifting the device management channel in the communication system according to the present embodiment (operation of resetting the device management channel according to a change of the connection status of the logical link) is explained, comparing with an operation in a conventional communication system. FIG. 5 is an operation example when there is a change in a connection status of a logical link in a conventional communication system, and FIG. 6 is an operation example when there is a change of a connection status of a logical link in the communication system according to the present embodiment.

In the conventional communication system, as shown in FIG. 5, a logical-link management channel exists for each logical link, and one of the logical-link management channels is used as a device management channel in a fixed manner. Therefore, for example, when a control of disconnecting an unused logical link (a logical link through which no general data is transmitted and received) is applied in order to reduce the power consumption, if the logical link used for the device management channel is disconnected, it disables communication of the device management channel, resulting in a state that the corresponding ONU cannot be managed. Alternatively, it is not possible to disconnect the logical link used for the device management channel, and as a result, the power consumption cannot be reduced. Contrary to this fact, in the communication system according to the present embodiment, the device management channel can be changed to a logical link in connected state between the OLT and the ONU, and therefore, even when an arbitrary logical link is disconnected in order to reduce the power consumption, it is possible to continue the device management.

In a system configuration that constantly maintains the device management channel based on the conventional technique, the logical link for device management channel (a logical link for setting the device management channel) is fixed, and therefore, when the ONU performs a data communication through one logical link as shown in FIG. 7, at least two logical links including a logical link #1 for the device management channel and a logical link #3 for the data communication are needed (when the data communication is performed through a logical link that is different from the logical link for device management channel). On the other hand, in the communication system according to the present embodiment, because the logical link for device management channel can be shifted, as shown in FIG. 8, bandwidth for maintaining one logical link can be saved by using only the logical link 3 for performing data communications.

Specifically, as shown in FIG. 7 and FIG. 8, the ONU receives a bandwidth allocation frame (GATE) from the OLT for each bandwidth update period, based on which the ONU transmits a bandwidth request amount frame (REPORT) for each logical link in each bandwidth update period. When a line rate is 1 Gbps, a bandwidth of about 2.5 microseconds (Laser ON 512 nanoseconds (ns), Sync time 800 ns, a REPORT frame of 84 Byte=672 ns, and Laser OFF 512 ns) is required in order to transmit one REPORT frame. A case in which 128 ONUs are connected to one OLT is considered here. If the bandwidth update period is 1 millisecond, when a REPORT frame for one logical link is reduced from one ONU, 0.25% of the bandwidth can be saved, and when the REPORT frame for one logical link is reduced from all the 128 ONUs, 32% of the bandwidth can be saved. Furthermore, if the bandwidth update period is 2 milliseconds, when the REPORT frame for one logical link is reduced from one ONU, 0.125% of the bandwidth can be saved, and when the REPORT frame for one logical link is reduced from all the 128 ONUs, 16% of the bandwidth can be saved. As described above, in the communication system according to the present embodiment, bandwidth usage efficiency can be improved in comparison with the system in which the device management channel is fixed. In FIGS. 7 and 8, "G" indicates the GATE frame, and "R" indicates the REPORT frame.

In this manner, in the communication system according to the present embodiment, when the connection status of the logical link between, the OLT and each ONU under control has been changed, the OLT is configured to reset a logical link having the highest priority at that point as the logical link for device management channel based on the priority of each logical link set in advance. With this configuration, even when a logical link used as the logical link for device management channel is disconnected, the device management of the ONU can be continued by using a new logical link for the device management channel. In addition, it is possible to reduce the power consumption of the system and improve the usage efficiency of the bandwidth.

In the process shown in FIG. 3, when the change of the connection status of the logical link is detected at Step S10, the processes after Step S11 are always performed; however, it can also be configured such that it is checked whether the logical link for device management channel is disconnected, and when the logical link for the device management channel is disconnected, the processes after Step S11 are performed.

Second Embodiment

In the first embodiment described above, when the connection status of a logical link has been changed, the OLT is configured to determine a new logical link for device management channel based on a priority (a selection priority of the logical link for device management channel) set in advance to each logical link, by which the device management of the ONU can be maintained. An embodiment in which the logical link for device management channel is determined based on a set bandwidth of the logical link is explained next. The set bandwidth is a communication bandwidth separately set to each logical link, which is, for example, a value according to the contents of a contract of a service received by using the logical link. The configuration of the communication system and the configurations of the OLT and the ONU are the same as those of the first embodiment (see FIG. 1). In the present embodiment, elements different from those of the first embodiment are explained.

FIG. 9 is an example of a logical-link-status management table stored in the device-management-channel control unit 16 of the OLT according to the second embodiment. This management table is the same as the logical-link-status management table explained in the first embodiment (see FIG. 2) except that the selection priority has been replaced with the set bandwidth. In the OLT according to the present embodiment, when determining the logical link for device management channel, it is determined based on the set bandwidth.

Figure 10:
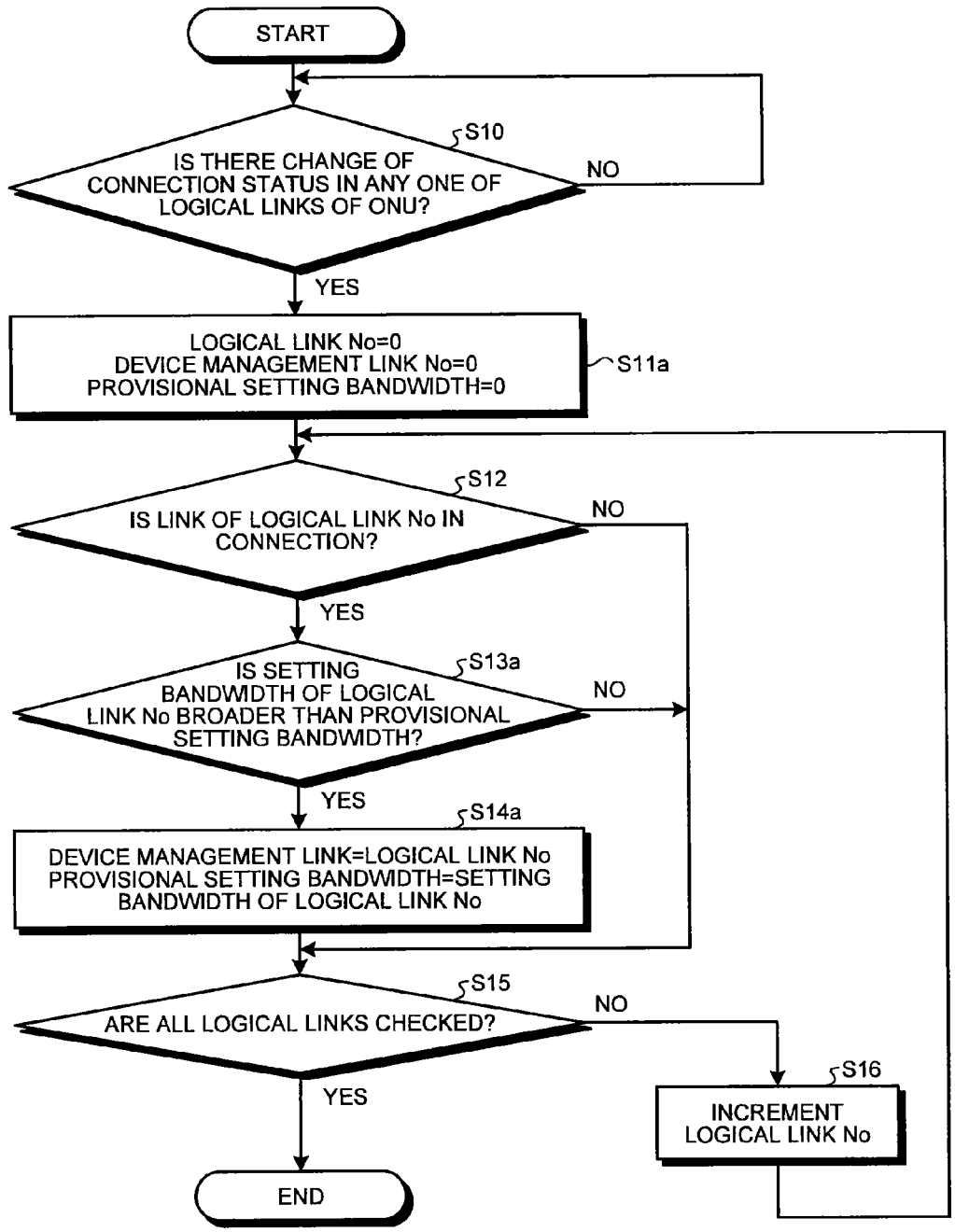
FIG. 10 is a flowchart of an example of a method of determining a logical link for setting a device management channel by a device-management-channel control unit of an OLT according to a second embodiment.

FIG. 10 is a flowchart of an example of a method of determining a logical link for setting a device management channel by the device-management-channel control unit 16 of the OLT 1 according to the second embodiment, in which Steps S11, S13, and S14 of the method of determining the logical link for device management channel described in the first embodiment (see FIG. 3) has been replaced with Steps S11a, S13a, and S14a. Only Steps S11a, S13a, and S14a that are different from corresponding ones of the first embodiment are explained below.

When there is a change in the connection status in any one of the monitored logical links (YES at Step S10), the device-management-channel control unit 16 according to the present embodiment initializes a logical link No that serves as an index to 0, initializes a device management link No to 0, and initializes a provisional set bandwidth to 0 (Step S11a).

Thereafter, at Step S12, when it is determined that a logical link indicated by the current logical link No is in connected state (YES at Step S12), the set bandwidth of the logical link indicated by the logical link No and the provisional set bandwidth are compared with each other (Step S13a). The set bandwidth of the logical link indicated by the logical link No is a set bandwidth recorded in the management table shown in FIG. 9, which is the set bandwidth corresponding to each logical link No in the ONU of which the connection status has been changed. When the set bandwidth of the logical link indicated by the logical link No is broader than the provisional set bandwidth (YES at Step S13a), the device management link, which is a logical link for setting the device management channel, is provisionally determined to be the logical link indicated by the current logical link No, and the provisional set bandwidth is updated to the set bandwidth of the logical link indicated by the current logical link No (Step S14a).

When the processes of Steps S12 to S14a are completed for all the logical links set to the ONU, the connection status of the logical link of which has been changed (YES at Step S15), the process of determining the logical link for setting the device management channel is ended. In this case, the device management link (the logical link corresponding to a value of the device management link at the time when the determination process is ended) that is provisionally determined at Step S14a described above is determined to be the final device management link, and thereafter the data frame of the device management channel is transmitted and received through this determined logical link.

In this manner, in the communication system according to the present embodiment, when the connection status of the logical link between the OLT and each ONU under control has been changed, the OLT is configured to reset a logical link having the broadest set bandwidth at that point as the logical link for the device management channel based on the set bandwidth of each logical link between the OLT and the ONU, the connection status of which has been changed. With this configuration, similarly to the first embodiment, even when a logical link used as the logical link for device management channel is disconnected, the device management of the ONU can be continued by using a new logical link for the device management channel. In addition, it is possible to reduce the power consumption of the system and improve the usage efficiency of the bandwidth.

Furthermore, because it is configured that the logical link having the broadest set bandwidth is set as the logical link for the device management channel, a memory area for storing the selection priority for each logical link, which is needed in the OLT according to the first embodiment, can be saved. Specifically, the memory area of an amount obtained by "area for storing the selection priority"×"number of management ONUs"×"number of logical links of one ONU" can be saved. For example, when the selection priority area is 1 Byte, the number of management ONUs is 128, and the number of logical links of one ONU is 8, the memory area of 1 KByte can be saved. Furthermore, because a logical link enabling the highest speed communication is selected, delay in the device management, that is, a transmission delay of the data frame for the device management channel from the ONU to the OLT can be reduced.

Third Embodiment

In the second embodiment described above, when the connection status of a logical link has been changed, the OLT is configured to determine a new logical link for a device management channel based on a set bandwidth of each logical link, by which the device management of the ONU can be maintained. An embodiment in which a logical link for a device management channel is determined based on a bandwidth update period of the logical link is explained next. In the present embodiment, configurations of a communication system and configurations of the OLT and the ONU are identical to those of the first embodiment (see FIG. 1). In the present embodiment, elements different from those of the first and second embodiments are explained.

FIG. 11 is an example of a logical-link-status management table stored in the device-management-channel control unit 16 of the OLT according to the third embodiment. This management table is same as the logical-link-status management table explained in the first embodiment (see FIG. 2) except that the selection priority is replaced with the bandwidth update period. In the OLT according to the present embodiment, when determining the logical link for device management channel, it is determined based on the bandwidth update period.

Figure 12:
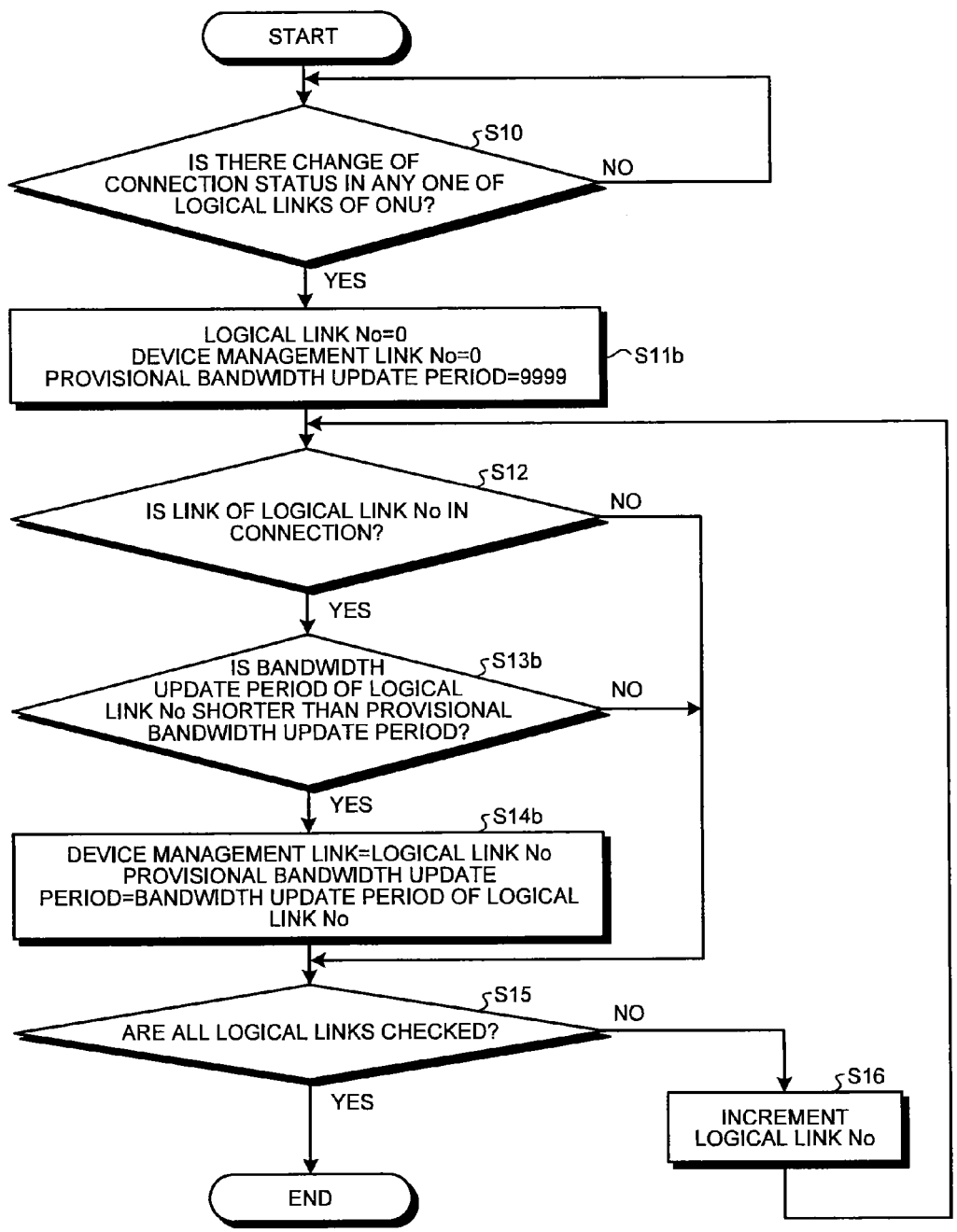
FIG. 12 is a flowchart of an example of a method of determining a logical link for setting a device management channel by a device-management-channel control unit of an OLT according to a third embodiment.

FIG. 12 is a flowchart of an example of a method of determining a logical link for setting a device management channel by the device-management-channel control unit 16 of the OLT 1 according to the third embodiment, in which Steps S11, S13, and S14 of the method of determining the logical link for device management channel explained in the first embodiment (see FIG. 3) are replaced with Steps S11b, S13b, and S14b. Only Steps S11b, S13b, and S14b that are different from corresponding ones of the first embodiment are explained below.

When there is a change in the connection status in any one of the monitored logical links (YES at Step S10), the device-management-channel control unit 16 according to the present embodiment initializes a logical link No that serves as an index to 0, initializes a device management link No to 0, and initializes a provisional bandwidth update period to the maximum value (9999 in this example) (Step S11b).

Thereafter, at Step S12, when it is determined that a logical link indicated by the current logical link No is in connected state (YES at Step S12), the bandwidth update period of the logical link indicated by the logical link No and the provisional bandwidth update period are compared with each other (Step S13b). The bandwidth update period of the logical link indicated by the logical link No is a bandwidth update period recorded in the management table shown in FIG. 11, which is the bandwidth update period corresponding to each logical link No in the ONU, the connection status of which has been changed. When the bandwidth update period of the logical link indicated by the logical link No is shorter than the provisional bandwidth update period (YES at Step S13b), the logical link for device management channel is provisionally determined to be the logical link indicated by the current logical link No, and the provisional bandwidth update period is updated to the bandwidth update period of the logical link indicated by the current logical link No (Step S14b).

When the processes of Steps S12 to S14b are completed for all the logical links set to the ONU, the connection status of the logical link of which has been changed (YES at Step S15), the process of determining the logical link for setting the device management channel is ended. In this case, the device management link (a logical link corresponding to a value of the device management link at the time when the determination process is ended) that is provisionally determined at Step S14b described above is determined to be the final device management link, and thereafter the data frame of the device management channel is transmitted and received through this determined logical link.

In this manner, in the communication system according to the present embodiment, when the connection status of the logical link between the OLT and each ONU under control has been changed, the OLT is configured to reset a logical link having the smallest (shortest) bandwidth update period at that point as the logical link for the device management channel according to the bandwidth update period of each logical link between the OLT and the ONU, the connection status of which has been changed. With this configuration, similarly to the first and second embodiments, even when a logical link used as the logical link for device management channel is disconnected, the device management of the ONU can be continued by using a new logical link for device management channel. In addition, it is possible to reduce the power consumption of the system and improve the usage efficiency of the bandwidth.

Furthermore, because it is configured that the logical link having the shortest bandwidth update period is set as the logical link for the device management channel, similarly to the second embodiment, a memory area for storing the selection priority for each logical link, which is needed in the OLT according to the first embodiment, can be saved. Further, because a logical link enabling the shortest bandwidth update period is selected, similarly to the second embodiment, delay in the device management can be reduced.

Fourth Embodiment

In the third embodiment described above, when the connection status of a logical link has been changed, the OLT is configured to determine a new logical link for device management channel based on a bandwidth update period of each logical link, by which the device management of the ONU can be maintained. An embodiment in which a logical link for device management channel is determined based on an upstream traffic amount in a logical link is explained next. In the present embodiment, configurations of a communication system and configurations of the ONU are identical to those of the first embodiment (see FIG. 1), and only configurations of the OLT are partly different from those of the first embodiment. In the present embodiment, elements different from those of the first to third embodiments are explained.

Figures 13, 14:
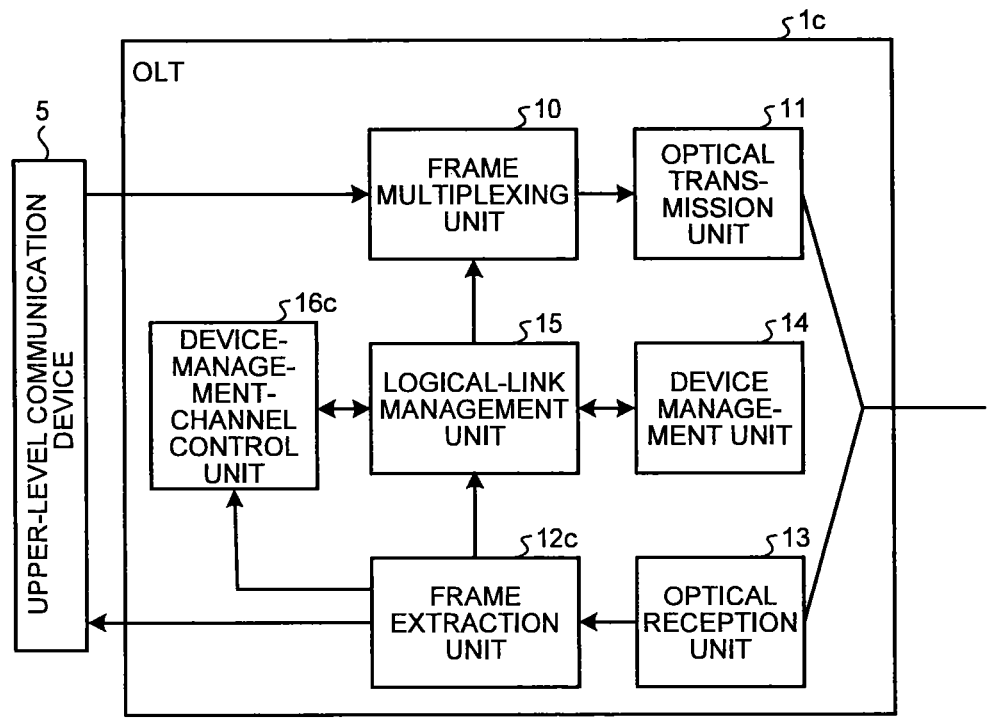
FIG. 13 is a configuration example of an OLT according to a fourth embodiment.
FIG. 14 is an example of a logical-link-status management table stored in a device-management-channel control unit of an OLT.

FIG. 13 is a configuration example of an OLT according to the fourth embodiment. As shown in FIG. 13, an OLT 1c according to the present embodiment is same as the OLT 1 according to the first to third embodiments (see FIG. 1) except that the frame extraction unit 12 and the device-management-channel control unit 16 are replaced with a frame extraction unit 12c and a device-management-channel control unit 16c, respectively. In the OLT 1c according to the present embodiment, the frame extraction unit 12c notifies traffic amount information of general upstream data transmitted to the upper communication device 5 for each logical link to the device-management-channel control unit 16c, and the device-management-channel control unit 16c counts and stores the traffic amount for each logical link. FIG. 14 is an example of a logical-link-status management table stored in the device-management-channel control unit 16c of the OLT 1 according to the third embodiment. This management table is same as the logical-link-status management table explained in the first embodiment (see FIG. 2) except that the selection priority is replaced with the traffic amount. The device-management-channel control unit 16c counts the traffic amount per unit time that is set in advance for each logical link and updates the management table (information on the traffic amount) shown in FIG. 14.

Figure 15:
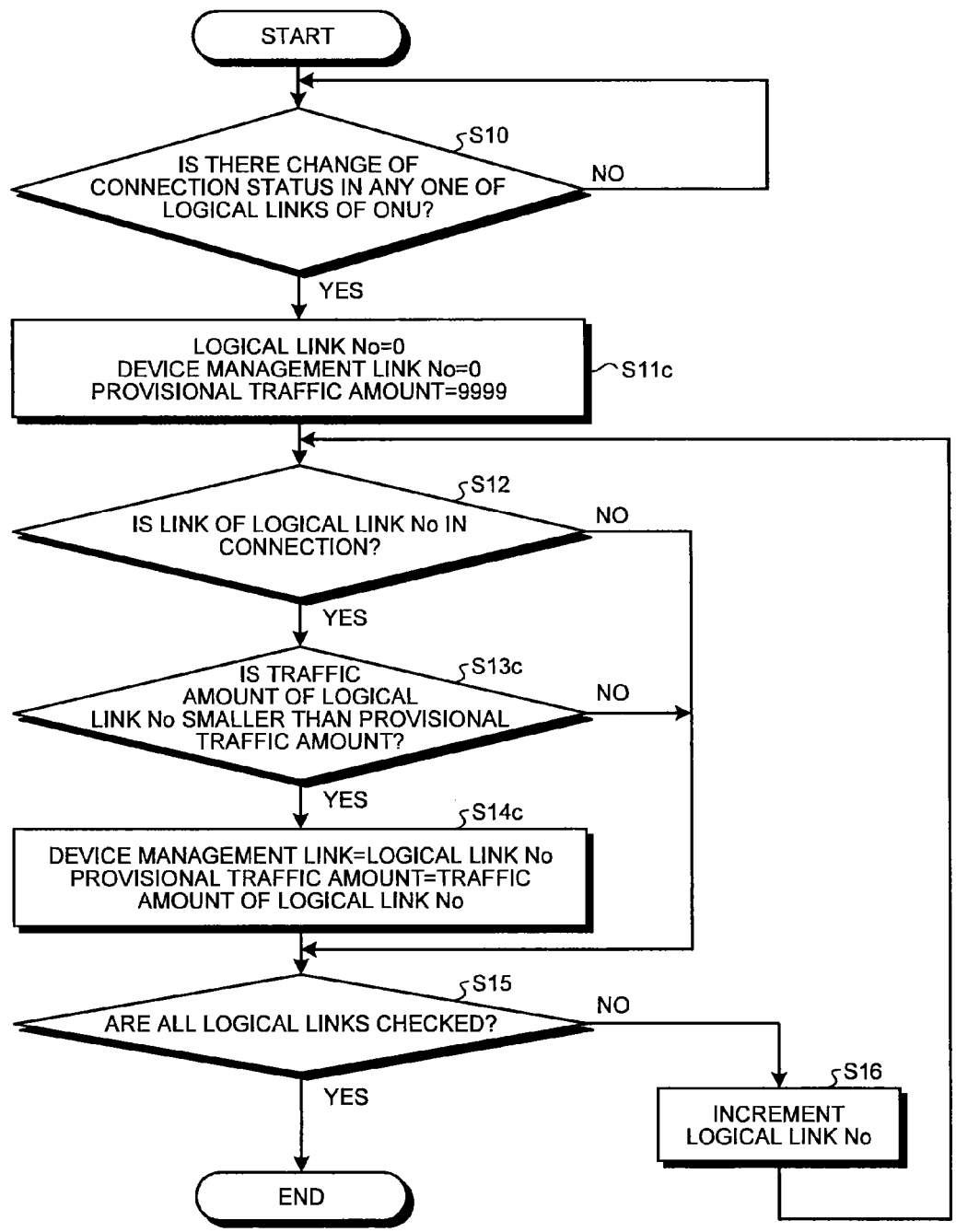
FIG. 15 is a flowchart of an example of a method of determining a logical link for setting a device management channel by a device-management-channel control unit of the OLT according to the fourth embodiment.

FIG. 15 is a flowchart of an example of a method of determining a logical link for setting a device management channel by the device-management-channel control unit 16 of the OLT 1c according to the fourth embodiment, in which Steps S11, S13, and S14 of the method of determining the logical link for the device management channel described in the first embodiment (see FIG. 3) are replaced by Steps S11c, S13c, and S14c. Only Steps S11c, S13c, and S14c that are different from corresponding ones of the first embodiment are explained below.

When there is a change in the connection status in any one of the monitored logical links (YES at Step S10), the device-management-channel control unit 16c according to the present embodiment initializes a logical link No that serves as an index to 0, initializes a device management link No to 0, and initializes a provisional traffic amount to the maximum value (9999 in this example) (Step S11c).

Thereafter, at Step S12, when it is determined that a logical link indicated by the current logical link No is in connected state (YES at Step S12), the traffic amount of the logical link indicated by the logical link No and the provisional traffic amount are compared with each other (Step S13c). The traffic amount of the logical link indicated by the logical link No is a traffic amount recorded in the management table shown in FIG. 14, which is a traffic amount corresponding to each logical link No in the ONU, the connection status of which has been changed. When the traffic amount of the logical link indicated by the logical link No is smaller than the provisional traffic amount (YES at Step S13c), the logical link for device management is provisionally determined to be the logical link indicated by the current logical link No, and the provisional traffic amount is updated to the traffic amount of the logical link indicated by the current logical link No (Step S14c).

When the processes of Steps S12 to S14c are completed for all the logical links set to the ONU, the connection status of the logical link of which has been changed (YES at Step S15), the process of determining the logical link for setting the device management channel is ended. In this case, the device management link (a logical link corresponding to a value of the device management link at the time when the determination process is ended) that is provisionally determined at Step S14c described above is determined to be the final logical link for device management channel, and thereafter the data frame of the device management channel is transmitted and received through this determined logical link.

In this manner, in the communication system according to the present embodiment, when the connection status of the logical link between the OLT and each ONU under control has been changed, the OLT is configured to reset a logical link having the minimum traffic amount as the logical link for device management channel according to the traffic amount in the upstream direction of each logical link between the OLT and the ONU of which the connection status has been changed. With this configuration, similarly to the first to third embodiments, even when a logical link used as the logical link for device management channel is disconnected, the device management of the ONU can be continued by using a new logical link for device management channel. In addition, it is possible to reduce the power consumption of the system and improve the usage efficiency of the bandwidth.

Furthermore, because it is configured that the logical link having the smallest traffic amount is set as the logical link for the device management channel, a logical link having the least congestion is set according to the state of service, and similarly to the second and third embodiments, delay in the device management can be reduced.

In the second and third embodiments described above, it is also possible to configure to perform the control considering the traffic amount in the upstream direction. For example, in the communication system according to the second embodiment, when there exists a plurality of logical links having the broadest set bandwidth from among the logical links in connected state (when there exists a plurality of logical links having the same set bandwidth and this set bandwidth is the broadest set bandwidth), a logical link having a less traffic amount among the logical links in connected state (logical links having the broadest set bandwidth) can be set as the logical link for the device management channel. Similarly, in the communication system according to the third embodiment, when there exists a plurality of logical links having the shortest bandwidth update period among the logical links in connected state, a logical link having a less traffic amount among the logical links having the shortest bandwidth update period can be set as the logical link for device management channel.

Fifth Embodiment

In the first to fourth embodiments described above, when shifting a device management channel, it is configured that the OLT transmits a device management channel instruction to the ONU in an explicit manner and the ONU transmits a device management channel permission to the OLT, by which the device management channel is shifted in an explicit manner (see FIG. 4). An embodiment in which a device management channel is shifted in an implicit manner is explained next. In the present embodiment, configurations of a communication system and configuration of the OLT are identical to those of the first embodiment (see FIG. 1), and only configurations of the ONU are partly different from those of the first embodiment. In the present embodiment, elements different from those of the first to fourth embodiments are explained.

Figure 16:
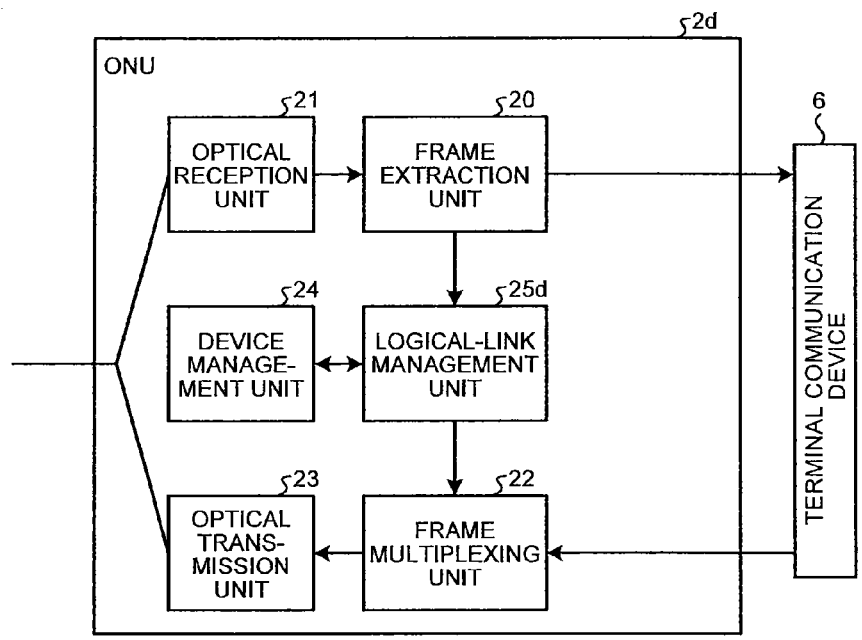
FIG. 16 is a configuration example of an ONU according to a fifth embodiment.

FIG. 16 is a configuration example of an ONU according to the fifth embodiment. As shown in FIG. 16, an ONU 2d according to the present embodiment is the same as the ONU 2 according to the first to fourth embodiments (see FIG. 1) except that the logical-link management unit 25 has been replaced by a logical-link management unit 25d and the device-management-channel control unit 26 is removed.

In the communication system according to the present embodiment, the OLT 1 notifies the ONU 2d of whether a data frame is a data frame of the logical-link management channel or a data frame of the device management channel by using a set value of a specific area in the data frame transmitted through the management channel without transmitting any device-management-channel instruction frame. That is, the OLT 1 transmits the data frame by setting a value indicating the data frame of the logical-link management channel or a value indicating the data frame of the device management channel to the specific area in the data frame. Therefore, in the ONU 2d, the logical-link management unit 25d analyzes the management-channel data frame received from the OLT 1 to check the value set in the specific area described above, and when the value indicates the device management (the device management channel), transfers data of the frame to the device management unit 24. The device management unit 24 performs management, setting, and the like of the device based on the contents of the data received from the logical-link management unit 25d. When a response is needed for the management and setting of the device, the ONU 2d makes a response by using the logical link used by the OLT 1 to transmit the data frame of the device management channel. When the ONU 2d transmits the data frame of the device management channel (except for the response frame with respect to the frame received from the OLT 1) to the OLT 1, the ONU 2d can transmit the data frame by using a logical link for the device management recently used by the OLT 1 or an arbitrary logical link. At this time, a value indicating that the data frame is the data frame of the device management channel is set to the data frame.

Figure 17:
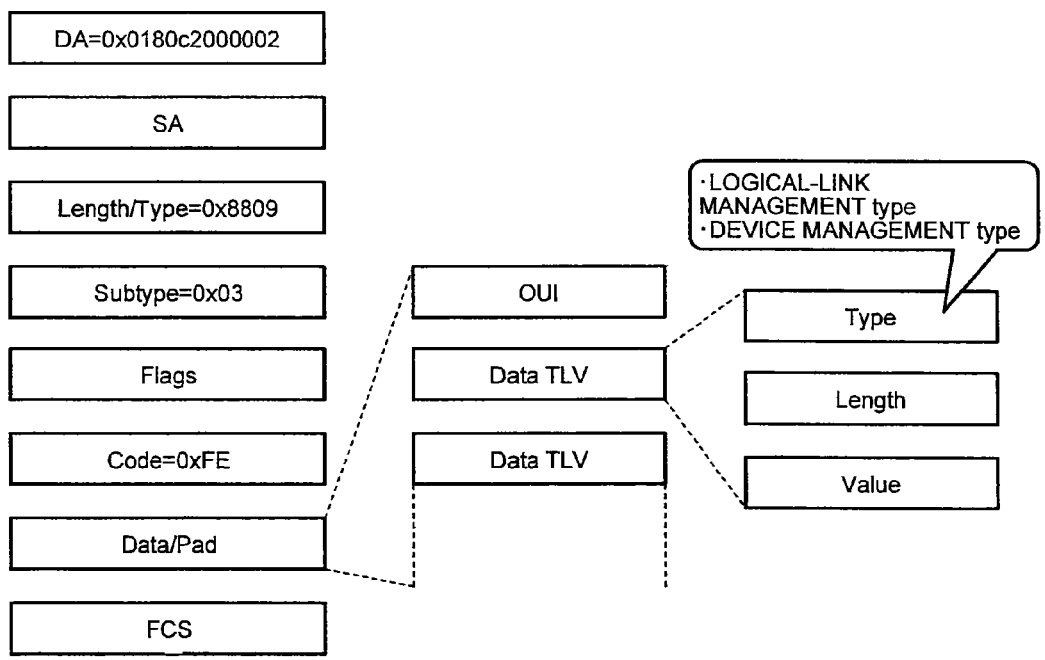
FIG. 17 is an example of a data frame format of a management channel used in a communication system according to the fifth embodiment.

FIG. 17 is an example of a data frame format of a management channel used in the communication system according to the fifth embodiment. The data frame shown in FIG. 17 is a data frame obtained by extending an OAM frame defined in Non Patent Literature 1. The frame includes a destination address (DA), a transmission source address (SA), a frame length or type (Length/Type), a sub-type (Subtype), a flag indicating a device status (Flags), a code indicating a frame type (Code), an area for storing data (Data/Pad), and a frame error check (FCS). Furthermore, as shown in FIG. 17, the Data area includes an area indicating an OUI indicating a vender. In the data frame used in the present embodiment, for example, a Data TLV is defined in the Data area following the OUI. The device management data and the logical-link management data are transmitted by using this Data TLV. A type (Type) and a length (Length), and a value (Value) are stored in the Data TLV. Although a specific management item and a set item are stored in the type and transmitted, a logical link type and a device management type are used for the value of the type. With this configuration, the reception side determines whether the received management-channel data frame is the data frame for the logical-link management or the data frame for the device management for each Data TLV. The management data is stored in the value (Value) area. The length (Length) indicates a length of the following value (Value) area. It is also possible to configure that a plurality of Data TLVs are set in one frame, and each area is used separately as the data for the logical-link management and the data for the device management (the data for the logical-link management and the data for the device management can be included in one frame).

FIG. 18 is an example of an operation of transmitting and receiving a device management frame (a management-channel data frame obtained by setting the device management data on the Data TLV) in the communication system according to the fifth embodiment.

As shown in FIG. 18, the OLT 1 initially transmits the device management frame through a logical link #1. The ONU 2d checks the contents of the management frame received through the logical link #1, processes the device management if the frame is for the device management, and processes the logical-link management if the frame is for the logical link. When changing the status of the logical link #1 to an unused status, the ONU 2d transmits a disconnection request to the OLT 1 via the logical link #1, and the OLT 1 transmits a disconnection permission frame to the ONU 2d via the logical link #1. Thereafter, the OLT 1 selects the device management channel (in this example, a logical link #3 is selected as the device management channel), and then transmits a management frame to the ONU 2d from the logical link #3, storing the device management type of the management frame (information indicating that the device management data is stored in the frame) in the management frame without notifying the change of the device management channel to the ONU 2d in an explicit manner. Upon receiving the management frame, when the device management type is set in the received management frame, the ONU 2d performs a device management operation without recognizing a logical link through which the management frame is received and regardless of the logical link through which the management frame is received. In the example shown in FIG. 18, because the device management type is set in the management frame of the logical link #3, the ONU 2d performs the device management based on the contents of the management frame received through the logical link #3. When a response is needed, the ONU 2d transmits a response management frame through the same logical link #3 as the logical link through which the management frame is received. The device management type is set in the management frame to be transmitted.

In this manner, in the communication system according to the present embodiment, when transmitting the management-channel data frame, it is configured that the OLT and the ONU set the logical-link management data or the device management data with respect to a head portion of a data storing area in the frame together with the information indicating the type of the management data. With this configuration, similarly to the first embodiment, the device management channel can be shifted to a logical link in connected state between the OLT and the ONU, and therefore, even when an arbitrary logical link is disconnected, it is possible to continue the device management of the ONU.

In the first to fourth embodiments, because the device management channel is specified in an explicit manner, even when the data for the device management channel is received from a wrong logical link, an erroneous management or setting of the device is not performed, thereby enhancing the reliability of the communication device. On the other hand, when the management frame is used in an implicit manner as in the present embodiment, any logical link can be used, so that an explicit management channel instruction can be omitted. Furthermore, because the device management channel can be made redundant, it is possible to enhance the reliability of the communication device regarding the device management.

In the first to fourth embodiments, it can be configured such that the OLT and the ONU can set information indicating the type of the management channel (information corresponding to the Type information described above) with respect to the management-channel data frame (a data frame of the logical-link management channel or a data frame of the device management channel) and transmit the data frame.

INDUSTRIAL APPLICABILITY

As described above, the logical-link management method according to the present invention is suitable for a communication system that requires management of a device in which a plurality of logical links are mounted.

REFERENCE SIGNS LIST 1, 1c OLT (master station device)
2, 2d ONU (slave station device)
3 optical fiber
4 splitter
5 upper communication device
6 terminal communication device
10, 22 frame multiplexing unit
11, 23 optical transmission unit
12, 12c, 20 frame extraction unit
13, 21 optical reception unit
14, 24 device management unit
15, 25, 25d logical-link management unit
16, 16c, 26 device-management-channel control unit

The invention claimed is:

1. A logical-link management method to be executed in an optical communication system including a station side device and a subscriber side device that is capable of setting a plurality of logical links between the station side device and the subscriber side device, the station side device transmitting a signal for managing the subscriber side device via a single logical link, the logical-link management method comprising:

a status monitoring step of the station side device monitoring whether there is a change in a connection status of a logical link between the station side device and the subscriber side device; and a link resetting step of the station side device resetting, when a change in the connection status of the logical link is detected at the status monitoring step, a logical link for device management that is a logical link used for transmitting the signal for managing the subscriber side device according to a predetermined procedure.

2. The logical-link management method according to claim 1, wherein at the link resetting step, the logical link for device management is set based on a priority that is set separately for each logical link and serves as an index for selecting the logical link for device management.

3. The logical-link management method according to claim 2, wherein at the link resetting step, a logical link having a highest one of the priority among logical links in connected state is set as the logical link for device management.

4. The logical-link management method according to claim 1, wherein at the link resetting step, the logical ink for device management is reset based on a set bandwidth of each logical link between the station side device and each ONU that is a subscriber side device under control.

5. The logical-link management method according to claim 4, wherein at the link resetting step, a logical link having a broadest set bandwidth among logical links in connected state is set as the d logical link for device management.

6. The logical-link management method according to claim 5, wherein when there are a plurality of logical links having a broadest set bandwidth, at the link resetting step, a logical link having a least traffic amount in an upstream direction is set as the logical link for device management.

7. The logical-link management method according to claim 1, wherein at the link resetting step, the logical link for device management is reset based on a bandwidth update period of each logical link between the station side device and each ONU under control.

8. The logical-link management method according to claim 7, wherein at the link resetting step, a logical link having a shortest bandwidth update period among logical links in connected state is set as the logical link for device management.

9. The logical-link management method according to claim 8, wherein when there are a plurality of logical links having a shortest bandwidth update period, at the link resetting step, a logical link having a least traffic amount in an upstream direction is set as the logical link for device management.

10. The logical-link management method according to claim 1, wherein at the link resetting step, the logical link for device management is set based on a traffic amount in an upstream direction in each logical link between the station side device and each ONU under control.

11. The logical-link management method according to claim 10, wherein at the link resetting step, a logical link having a least traffic amount in an upstream direction among logical links in connected state is set as the logical link for device management.

12. The logical-link management method according to claim 1, wherein when transmitting a signal for managing the subscriber side device, the station side device transmits data by attaching information indicating that transmission data is device management data to a head portion of the management data.

13. The logical-link management method according to claim 12, wherein
the subscriber side device receives device management data from the station side device, and when it is required to transmit reply data in response to the received device management data, the subscriber side device transmits the reply data via a logical link through which the subscriber side device has received the device management data from the station side device.

14. A communication device configured to operate as a station side device in an optical communication system including a station side device and a subscriber side device that is capable of setting a plurality of logical links between the station side device and the subscriber side device, the station side device transmitting a signal for managing the subscriber side device by using a single logical link in a fixed manner, the communication device comprising:
   a status monitoring unit that monitors a set status of each logical link between the station side device and the subscriber side device; and
   a logical-link management unit that determines, based on a monitoring result of the status monitoring unit, whether resetting of a logical link for device management that is a logical link used for transmitting the signal for managing the subscriber side device in a fixed manner is required, and when it is determined that resetting is required, resets the logical link for device management according to a predetermined procedure.

15. The communication device according to claim 14, wherein the logical-link management unit resets the logical link for device management based on a priority that is set for each logical link in advance and serves as an index for selecting the logical link for device management.

16. The communication device according to claim 14, wherein the logical-link management unit resets the logical link for device management based on a set bandwidth of each logical link between the station side device and each ONU under control.

17. The communication device according to claim 14, wherein the logical-link management unit resets the logical link for device management based on a bandwidth update period of each logical link between the station side device and each ONU under control.

18. The communication device according to claim 14, wherein the logical-link management unit resets the logical link for device management based on a traffic amount in an upstream direction in each logical link between the station side device and each ONU under control.

19. The communication device according to claim 14, further comprising a device-management-data transmission unit that transmits, when transmitting a signal for managing the subscriber side device, management data by attaching information indicating that transmission data is device management data to a head portion of the management data.

* * * * *